US012794808B2

(12) United States Patent
Zhou et al.

(10) Patent No.: US 12,794,808 B2
(45) Date of Patent: Nov. 10, 2026

(54) AUTOMATIC DATA TRAFFIC REDIRECTION

(71) Applicant: Lemon Inc., Grand Cayman (KY)

(72) Inventors: Yanlin Zhou, Los Angeles, CA (US); Yingan Wang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 138 days.

(21) Appl. No.: 18/979,345

(22) Filed: Dec. 12, 2024

(65) Prior Publication Data

US 2026/0172331 A1 Jun. 18, 2026

(51) Int. Cl.
*H04L 47/122* (2022.01)
*H04L 43/08* (2022.01)
*H04L 47/24* (2022.01)

(52) U.S. Cl.
CPC ............ *H04L 47/122* (2013.01); *H04L 43/08* (2013.01); *H04L 47/24* (2013.01)

(58) Field of Classification Search
CPC ........ H04L 47/122; H04L 43/08; H04L 47/24
See application file for complete search history.

(56) References Cited

U.S. PATENT DOCUMENTS 6,532,212 B1 * 3/2003 Soloway ................ H04L 47/29 398/45
8,743,700 B2 * 6/2014 Heinz ..................... H04L 43/16 370/241
12,192,077 B1 * 1/2025 Boissier .................. H04L 43/16
2013/0339519 A1 * 12/2013 Lientz ................. H04L 43/0888 709/224
2013/0343174 A1 * 12/2013 Guichard ............ H04L 41/5025 370/218
2020/0162944 A1 * 5/2020 Barton .................. H04W 24/04
2021/0126870 A1 * 4/2021 Thiel ................... H04L 41/5025
2022/0417610 A1 * 12/2022 Chandrashekar ............................ H04N 21/23116
2024/0333784 A1 * 10/2024 Reznik .................. H04L 65/612
2025/0379820 A1 * 12/2025 Narahari ............. H04L 43/0829
2026/0172331 A1 * 6/2026 Zhou ..................... H04L 43/067

* cited by examiner

*Primary Examiner* — David R Lazaro
(74) *Attorney, Agent, or Firm* — Alleman Hall LLP

(57) ABSTRACT

A method for redirecting data traffic includes monitoring transmission of data traffic to a plurality of client computing devices in a geographic area via a computer network, including at least a first content delivery network (CDN) and a second CDN. A real-time Quality of Service (QoS) parameter is measured that indicates a network performance of the computer network during a current time interval. Based on the real-time QoS parameter being lower than a baseline QoS parameter that indicates a historical performance of the computer network, an incident score is calculated that quantifies a degradation in the network performance. Based on the incident score, the data traffic is automatically redirected, such that a first portion of the data traffic delivered to the plurality of client computing devices using the first CDN is reduced, and a second portion of the data traffic delivered using the second CDN is increased.

20 Claims, 7 Drawing Sheets

AUTOMATIC DATA TRAFFIC REDIRECTION

BACKGROUND

Distributed data delivery platforms are commonly used to facilitate and manage the dissemination of digital content to client computing devices. Some such platforms may be used to distribute digital content to client devices across a wide geographic area—e.g., spanning multiple countries or even the entire globe. In some cases, the data may be disseminated using content delivery networks (CDNs), which include geographically distributed networks of servers configured to deliver digital content, such as web pages, videos, images, and other data, to client computing devices.

SUMMARY

A method for redirecting data traffic includes streaming data traffic to a plurality of client computing devices in a geographic area via a computer network, including at least a first content delivery network (CDN) and a second CDN. A real-time Quality of Service (QoS) parameter is measured that indicates a network performance of the computer network during a current time interval. Based on the real-time QoS parameter being lower than a baseline QoS parameter that indicates a historical performance of the computer network, an incident score is calculated that quantifies a degradation in the network performance. Based on the incident score, the data traffic is automatically redirected, such that a first portion of the data traffic delivered to the plurality of client computing devices using the first CDN is reduced, and a second portion of the data traffic delivered using the second CDN is increased.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
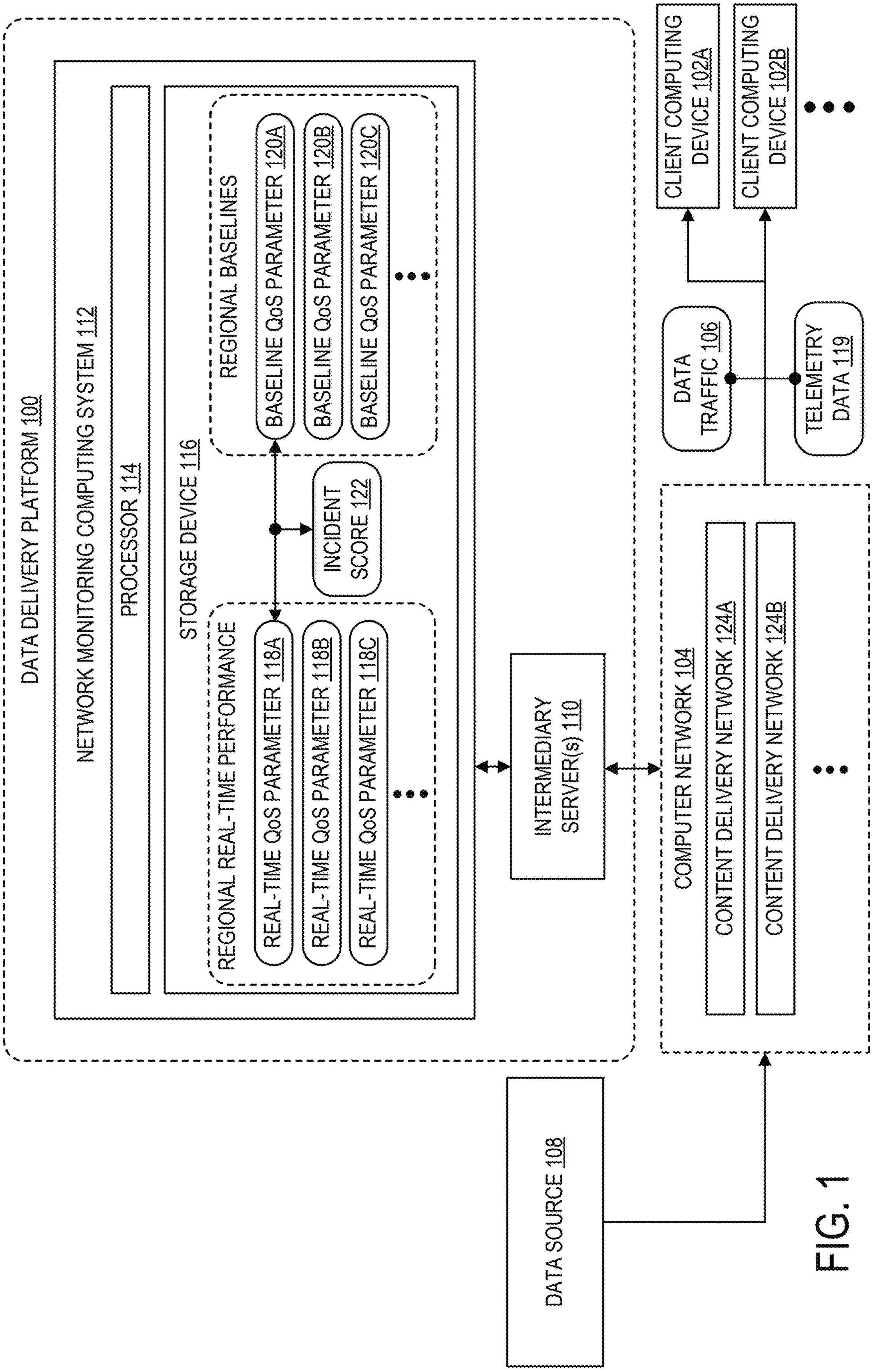
FIG. 1 shows a schematic view of an example data delivery platform including a network monitoring computing system.

A distributed data delivery platform may be used to transmit computer data to a number of different client computing devices distributed across a wide geographical area. For instance, video livestreaming platforms may be used to deliver video data to millions of different client computing devices that are located all around the world. It is generally desirable to monitor the quality and stability of the data traffic delivered from the platform to the different client computing devices. For instance, the platform may be configured to monitor the proportion of dropped data packets or frames, monitor the bitrate of streamed video, calculate a pull success rate (PSR), and/or collect other suitable information pertaining to the network performance.

However, comparing network performance across a wide range of geographic areas presents significant challenges, particularly given the inherent variability in network conditions between different regions. Factors such as differences in infrastructure quality, availability of bandwidth, latency caused by long transmission distances, and localized network congestion can result in vastly different performance levels across the globe. These disparities are further compounded by the dynamic nature of network performance, which can fluctuate due to changes in traffic patterns, outages, or environmental conditions. This can make it difficult to determine when an observed degradation in network performance is due to an actual problem with the data delivery platform, or is normal for a given geographic area given local network conditions.

Accordingly, the present disclosure is directed to techniques for monitoring network conditions in a computer network, and then taking automated action to address an observed degradation in network performance. Specifically, as will be described in more detail below, a network monitoring computing system associated with a data delivery platform monitors the transmission of data traffic to client computing devices in a geographic area. The computing system measures a real-time Quality of Service (QoS) parameter indicative of the relative quality of the data transmission to that geographic area. For instance, the QoS parameter may include the average pull success rate (PSR) of the client computing devices in that geographic area. This is compared to a baseline QoS parameter, which is indicative of the historical network performance in the geographic area. In other words, the baseline QoS parameter may represent expected network conditions for that area, and may be specific to a certain period of time (e.g., a certain hour of the day). When the real-time QoS parameter is lower than the baseline QoS parameter, this indicates a degradation in network performance compared to what is expected.

Accordingly, the real-time QoS parameter and the baseline parameter are used to calculate an incident score to quantify the degradation in network performance. Based on this incident score, in some cases, the network monitoring computing system may automatically redirect at least a portion of the data traffic delivered to the client computing devices. For instance, within a given geographic area, multiple different content delivery networks (CDNs) may be used as intermediaries in serving data from the data delivery platform to the client computing devices. An observed degradation in network performance may be caused by problems or outages at one or more CDNs. Accordingly, in some cases, the network monitoring computing system may automatically redirect at least some data traffic from one CDN to another, based on a calculated incident score satisfying a threshold. The system may then continue monitoring network traffic to determine if network performance has improved as a result of the traffic redirection.

In this manner, the techniques described herein beneficially result in an improvement to network performance as data traffic is delivered to client computing devices. For instance, data may be received at the client computing devices more consistently, with fewer dropped network packets/frames, resulting in an improved user experience. These techniques improve over scenarios where real-time QoS parameters are compared to fixed thresholds to detect network problems—e.g., by enabling detection of cases where network performance has been slowly falling but has not yet crossed the fixed threshold, and also by avoiding unnecessary false positives when reduced network performance is expected for a given area based on historical trends. Furthermore, the techniques described herein enable automated redirection of network traffic based on detected network conditions, which reduces the burden on human operators performing manual network reconfiguration.

FIG. 1 schematically shows an example data delivery platform 100, which is communicatively coupled with a plurality of client computing devices, including client computing devices 102A and 102B, via a computer network 104. The data delivery platform is facilitating the transmission of data traffic 106 originating from a data source 108 to client computing devices 102A and 102B.

In general, a "data delivery platform" is a system or service designed to transmit data traffic from centralized or distributed data sources to client computing devices over a computer network. Depending on the application, the content delivered can include media streams (e.g., audio, video), websites, software updates, files, or other forms of digital data. As such, a "data delivery platform" may include livestreaming services (e.g., platforms that deliver real-time video or audio streams, such as live sports, gaming, or event broadcasts), on-demand streaming services (e.g., platforms for distributing pre-recorded media content, such as movies, music, or podcasts), web hosting platforms, cloud storage services, interactive web applications (e.g., gaming servers, collaborative software tools), and/or any other web service used to deliver data traffic to client computing devices over a computer network.

The data delivery platform may be implemented using any suitable underlying physical infrastructure. This may include, for instance, network edge servers (e.g., configured to cache data traffic for delivery to client computing devices in a given geographic area), origin servers (e.g., storing the original source of the data traffic, such as prerecorded video data), ingestion servers (e.g., configured to receive new data traffic from user devices, such as in livestreaming scenarios), load balancing systems, monitoring and analytics servers, physical network infrastructure (e.g., servers, routers, switches), backup and redundancy systems, etc. For the sake of simplicity, in FIG. 1, this infrastructure is generically represented as intermediary server(s) 110, which may perform any or all of the functions described above. Additionally, the data delivery platform includes a network monitoring computing system 112, which will be described in more detail below. In general, the data delivery platform may be implemented using any suitable number of different computing devices, each of which may have any suitable roles, capabilities, and hardware configurations.

Similarly, as described herein, a "client computing device" may take the form of any suitable computing device that receives data traffic via a data delivery platform. As non-limiting examples, client computing devices may include personal computers (e.g., desktops, laptops), mobile computing devices (e.g., smartphones, tablets), wearable computing devices (e.g., head-mounted display devices, smart watches), media streaming devices, server computing devices, etc.

In this example, the data traffic originates from a data source 108 that is depicted as being separate from the data delivery platform. For instance, the data traffic may take the form of livestreamed data (e.g., live audio and/or video) that originates from a user computing device, such as a personal computer or mobile device. Such data may be transmitted via the computer network to the data delivery platform, for distribution to the client computing devices. In other examples, however, the data traffic may originate from the data delivery platform itself, and/or from any other suitable source. For instance, in cases where the data traffic includes prerecorded video, audio, data files, or other types of non-livestreamed data, then such data may in some cases be stored by computing devices implementing the data delivery platform (e.g., stored in server computers in a data center).

Furthermore, the computer network may take any suitable form. In general, as used herein, the "computer network" refers to the internet, and enables transmission of data from the data delivery platform to the client computing devices. It will be understood that, in other examples, the techniques described herein may be applicable to other types of computer networks besides the internet. In any case, the computer network may be implemented using any suitable underlying physical and logical infrastructure.

For instance, as will be described in more detail below, in some examples, two or more different CDNs may be used to deliver data traffic to a given geographic area. Each CDN may include a different respective set of geographically distributed server computing devices, configured to receive data traffic and deliver it to the plurality of client computing devices within a given geographic area. As such, computer network 104 may include two or more CDNs used to deliver data traffic 106 to the client computing devices—e.g., a first CDN and a second CDN. In some cases, data traffic may be redirected from one CDN to another to attempt to improve network performance, as will be described in more detail below.

In any case, the data source may be implemented as any suitable computing system of one or more computing devices, and may transmit any suitable type of computer data to the data delivery platform via computer network 104, for eventual delivery to the client computing devices. Any computing devices used to implement the data source, the client computing devices, and the data delivery platform itself may have any suitable capabilities, hardware configuration, and form factor. For instance, any or all of such devices may be implemented as computing system 900 described below with respect to FIG. 9.

Within the data delivery platform, network monitoring computing system 112 is used to monitor the relative quality of the data traffic transmitted to the client computing devices. The network monitoring computing system includes a processor 114, which may be implemented as any suitable computer logic hardware. As one non-limiting example, processor 114 may be implemented as logic processor 902 of computing system 900 described below with respect to FIG. 9. Similarly, the network monitoring computing system includes a storage device 116. This may be implemented using any suitable computer data storage hardware. For instance, the storage device may be implemented as either or both of volatile memory 904 and non-volatile storage device 906 of computing system 900.

More particularly, according to the present disclosure, the network monitoring computing system measures a real-time QoS parameter indicating the network performance of the computer network in delivering the data traffic to the client computing devices. A real-time QoS parameter may be expressed relative to any suitable interval of time—e.g., one minute, one hour, one day, etc.—referred to herein as a "current time interval." In FIG. 1, the network management computing system has measured a real-time QoS parameter 118A, indicating the relative quality with which data traffic 106 is being delivered to the client computing services.

This may be inferred from any suitable information measured by the data delivery platform, and/or reported by the client computing devices. As non-limiting examples, the QoS parameter may be implemented as, or calculated based on, the average rate of packet loss for the client computing devices, round trip latency, bitrate stability, pull success rate (PSR), buffering time and/or frequency (e.g., the frequency and duration of a client-side media player buffering during data playback), client-side telemetry, viewer engagement metrics, and/or any other suitable information. For instance, in FIG. 1, the network monitoring computing system may in some cases receive telemetry data 119 from the client computing devices, and determine the real-time QoS parameter based at least in part on the telemetry data.

As discussed above, different client computing devices receiving data traffic from the data delivery platform may be distributed between different geographic areas. Network performance may vary between different geographic areas—e.g., based on local underlying network infrastructure, usage patterns, environment conditions, the CDNs used to deliver data traffic to each area, and/or the configuration of the data delivery platform. To this end, in some examples, the network monitoring computing system may calculate a plurality of different real-time QoS parameters indicating the relative performance of the computer network in a plurality of different geographic areas. In the example of FIG. 1, the network monitoring computing system has measured a plurality of different regional real-time QoS parameters, including parameters 118A, 118B, and 118C, each corresponding to different geographic areas in which client computing devices are located.

Additionally, the network monitoring computing system has calculated baseline QoS parameters for each geographic area. These include the same data type(s) as the real-time QoS parameters (e.g., packet drop rate, bitrate stability, PSR, etc.), but are calculated based on historical data rather than real-time data collected for the current time interval. In other words, the baseline QoS parameters indicate the typical network performance for different geographic areas, and serve as a baseline for comparison to the real-time QoS parameters in detecting changes in network performance. In FIG. 1, the network monitoring computing system stores several baseline parameters 120A, 120B, and 1202C, corresponding to the same geographic areas as the real-time QoS parameters 118A, 118B, and 118C.

In some examples, different baseline QoS parameters may be calculated for different times, with any suitable granularity. For instance, the network monitoring computing system may calculate different baseline QoS parameters for each day, each hour within a day, each minute, and/or for any other interval. Each baseline QoS parameter may be calculated in any suitable way, based on any suitable collection of historical data. For instance, the network performance measured at the same hour for each of several preceding days may be averaged in order to calculate the baseline QoS parameter for that hour, for that geographic area.

In some cases, different candidate baseline QoS parameters may be calculated for different intervals of time. In other words, the network monitoring computing system may measure a first baseline candidate for a first previous interval of time (e.g., the preceding three days), and a second baseline candidate for a second previous interval of time (e.g., the preceding thirty days, excluding the most recent three days). The network monitoring computing device may then select whichever of the first baseline candidate and the second baseline candidate is higher. This can beneficially account for scenarios where network performance is better or worse than usual over a sustained period of time (e.g., several days) due to local environmental conditions or usage patterns, such as weather events, holidays, student exams, etc.

In any case, a measured real-time QoS parameter may be compared to a corresponding baseline QoS parameter for the same geographic area and same relative time period (e.g., hour of the day), in order to evaluate the current performance of the network compared to expected performance. In scenarios where the real-time QoS parameter is lower than the baseline QoS parameter, this is indicative of degraded network performance, which could potentially be resolved through action on the part of the data delivery platform. For instance, if the degradation in network performance is caused by problems at a particular CDN, then redirecting at least a portion of the data traffic to other CDNs may improve network performance.

As such, based at least in part on the real-time QoS parameter and the baseline QoS parameter, the network monitoring computing system calculates an incident score that quantifies a degradation in the network performance as data is transmitted to a particular geographic area. In the example of FIG. 1, the network monitoring computing system compares real-time QoS parameter 118A to the corresponding baseline QoS parameter 120A to calculate an incident score 122. In some cases, based on the incident score, the network monitoring computing system may initiate automated network management processes aimed at reducing the incident score, thereby improving the real-time network performance in the affected geographic area.

Figure 2:
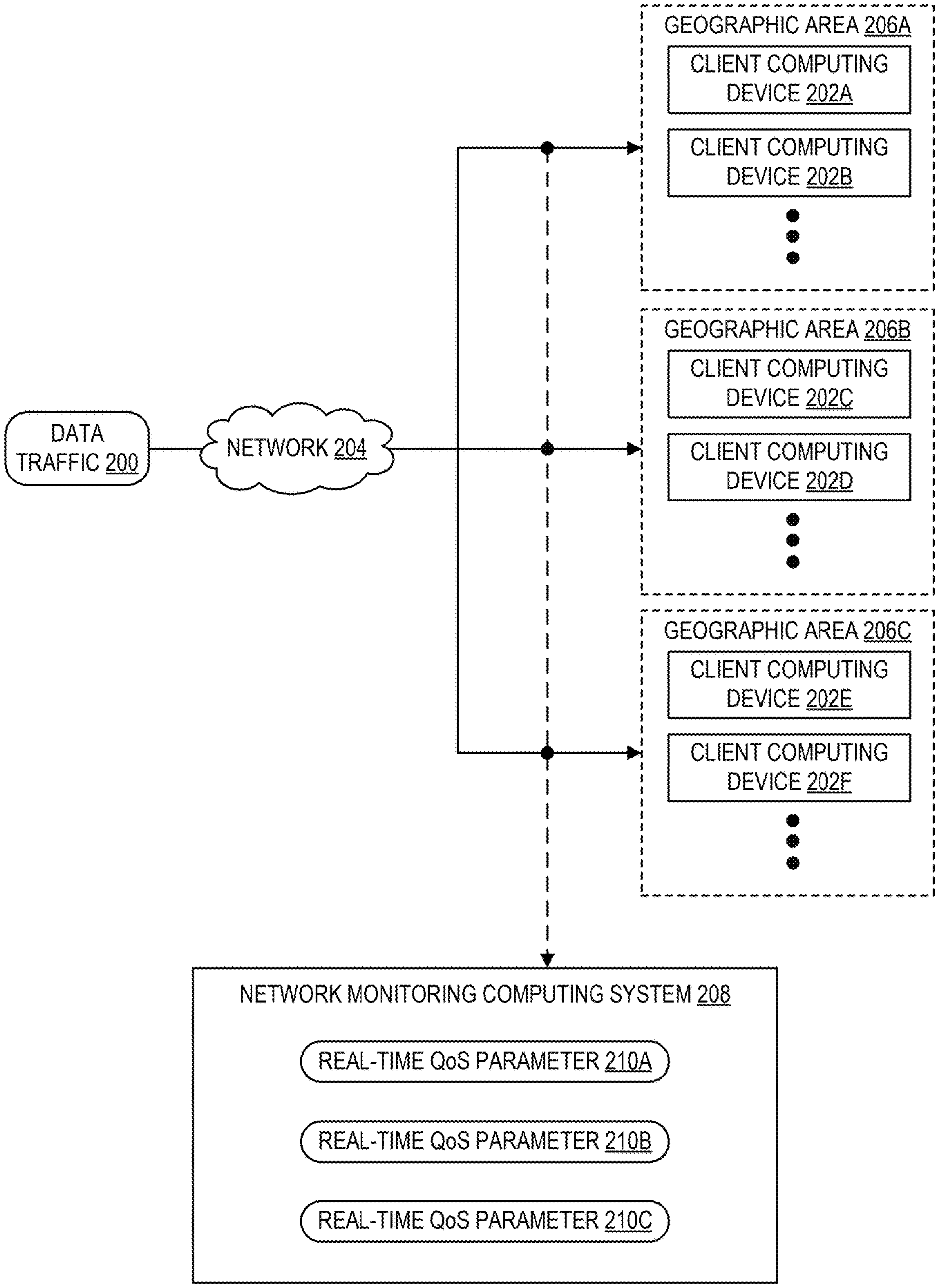
FIG. 2 schematically illustrates measuring real-time Quality of Service (QoS) parameters for client computing devices in a plurality of different geographic areas.

The monitoring of real-time network performance is schematically illustrated in more detail with respect to FIG. 2. Specifically, FIG. 2 schematically shows the transmission of data traffic 200 to a plurality of different client computing devices 202A-202F via a computer network 204. As shown, the client computing devices are distributed between various geographic areas 206A, 206B, and 206C. These may correspond to any suitable divisions of the physical world—e.g., different "geographic areas" may correspond to different continents, countries, districts, states, cities, neighborhoods, etc.

FIG. 2 also schematically shows another network monitoring computing system 208 associated with a data delivery platform. As shown, the network monitoring computing system monitors the delivery of data traffic 200 to the client computing devices, and thereby measures different respective real-time QoS parameters 210A, 210B, and 210C. As discussed above, these may include and/or be calculated based on any suitable information relating to network performance, such as PSR, packet drop rate, bitrate stability, telemetry data received from the client computing devices, etc. In other words, these indicate the relative quality with which the client computing devices in each different geographic area are receiving the data traffic from the data delivery platform.

Figure 3:
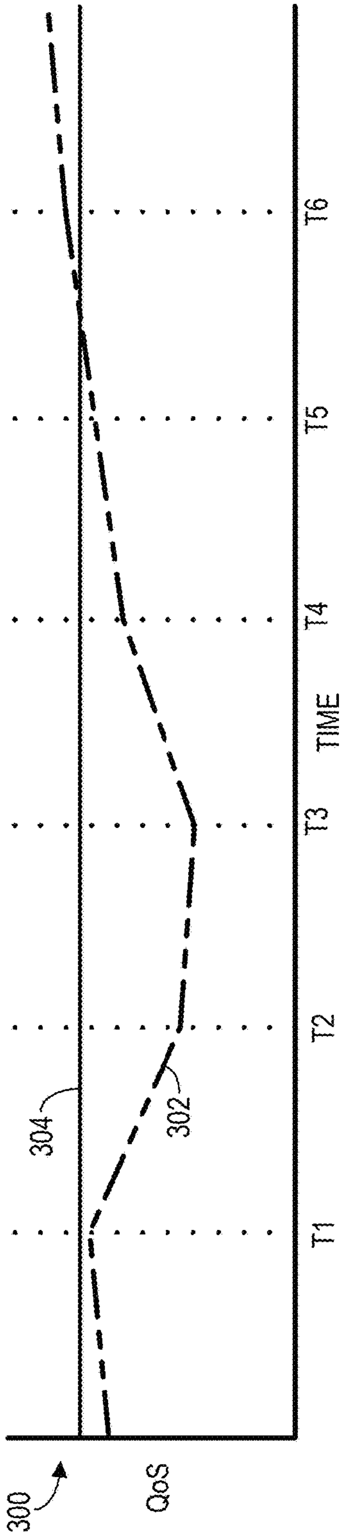
FIG. 3 shows an example plot depicting changes in a real-time QoS parameter over time.

Once the real-time QoS parameters are calculated, they are compared to corresponding baseline QoS parameters for the same geographic area. FIG. 3 depicts an example plot 300, which is used to illustrate changes in a real-time QoS parameter 302 over time, compared to a baseline QoS parameter 304. In this example, the baseline QoS parameter remains unchanged throughout the depicted time interval, although this need not be the case. It will be understood that plot 300 (as well as plot 400 described below) may represent any suitable duration of time. For instance, as one example, each interval T (e.g., T1, T2, T3) may represent different hours, such that one hour passes between T1 and T2.

As shown, prior to T1, the real-time QoS parameter is similar to the baseline QoS parameter. However, beginning at T1, the real-time QoS parameter begins dropping relative to the baseline QoS parameter. In order to quantify this degradation in the network performance, the network monitoring computing system may calculate an incident score proportional to the difference between the real-time QoS parameter and the baseline QoS parameter. In other words, the value of the incident score (and thereby the severity of the incident) may be proportional to the area between the lines depicting the real-time QoS parameter and the baseline QoS parameter in plot 300.

Figure 4:
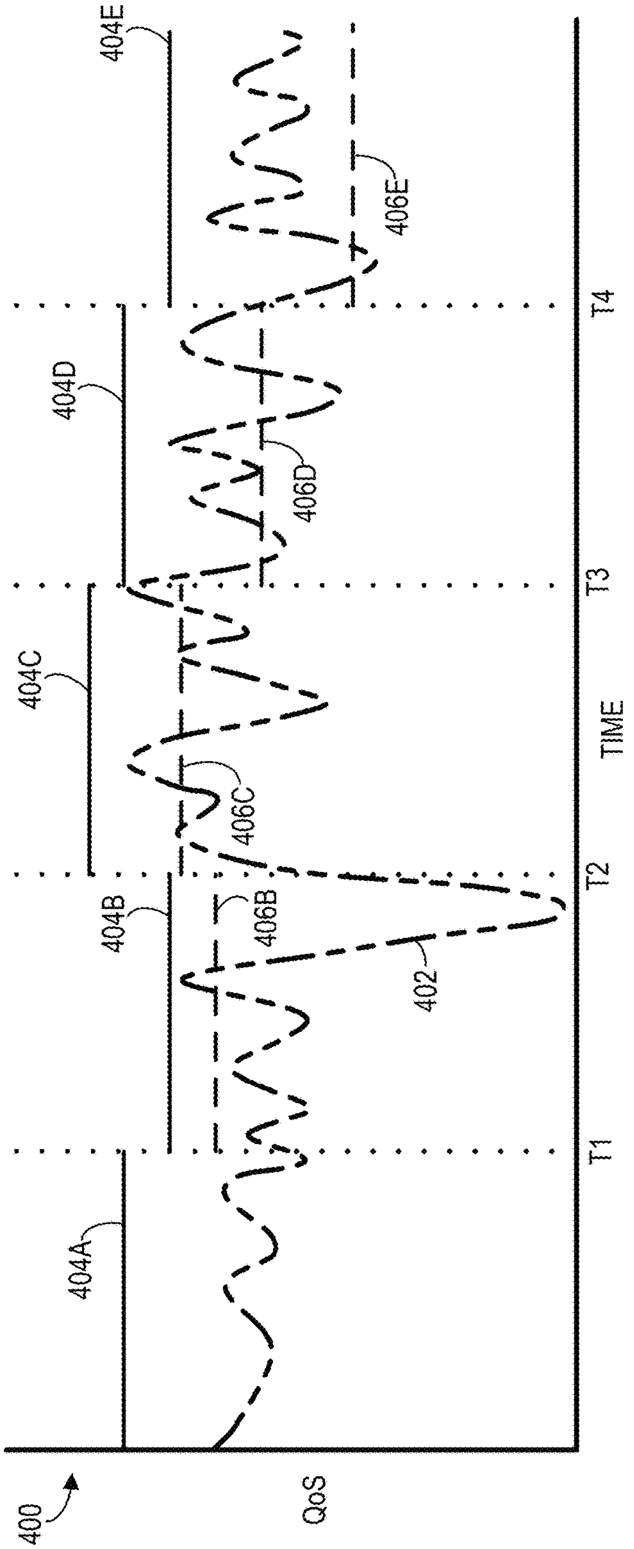
FIG. 4 shows another example plot depicting changes in a real-time QoS parameter and a baseline QoS parameter over time.

FIG. 4 depicts another example plot 400, also used to illustrate changes in a real-time QoS parameter 402 over time. In this example, the real-time QoS parameter is compared to a plurality of different baseline QoS parameters 404A, 404B, 404C, 404D, and 404E, which are specific to different time intervals. For instance, these baseline QoS parameters 404N may represent expected network conditions at different hours throughout the day, as environmental conditions and local network usage patterns change.

In some examples, adjustments may be applied to the baseline QoS parameters over time. For instance, in some examples, in response to determining that the real-time QoS parameter is lower than the baseline QoS parameter, the computing system may progressively decrease the baseline QoS parameter by up to a maximum baseline adjustment. This can beneficially account for scenarios where slight or gradual reductions in network performance are caused by local network conditions in the geographic area and are not resolvable by the data delivery platform. As such, small reductions in the baseline QoS parameter can reduce the incident score of an ongoing incident, and may therefore result in the data delivery platform taking fewer or no automated actions (e.g., alarms, ticket generation, data traffic redirection) to attempt to resolve the incident. In other words, this can beneficially reduce the response of the data delivery platform, and/or human operators of the data delivery platform, in cases where the observed degradation in network performance is caused by factors beyond their control.

This concept is also schematically illustrated with respect to FIG. 4. Specifically for each time interval beyond T1, the network management computing system progressively reduces the baseline QoS parameters. This is represented by the reduced baseline QoS parameters 406B, 406C, 406D, and 406E shown in each time interval. This progressive decrease in the baseline QoS parameters may continue until the incident is resolved (e.g., the incident score falls below a threshold), or until a maximum baseline adjustment is reached. As one non-limiting example, the maximum baseline adjustment may be one percent of the original value of the baseline QoS parameter, and the baseline QoS parameter may be reduced by 0.2% each hour until the maximum baseline adjustment has been reached.

Figure 5:
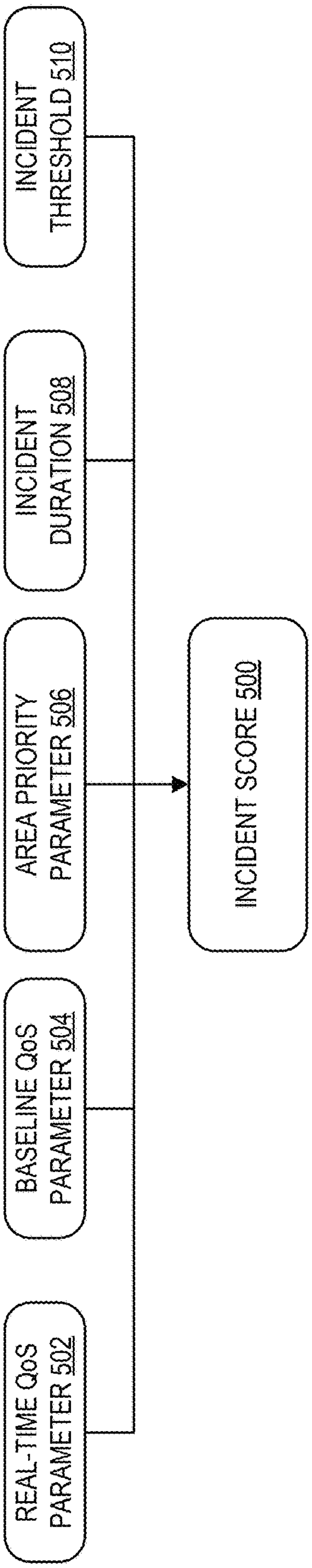
FIG. 5 schematically illustrates calculation of an incident score based at least in part on a real-time QoS parameter and a baseline QoS parameter.

In any case, as discussed above, the real-time QoS parameter and a corresponding baseline QoS parameter for the same geographic area may be used in calculating an incident score that quantifies a degradation in the network performance in that geographic area. This is schematically illustrated with respect to FIG. 5, depicting the calculation of an incident score 500 based on a real-time QoS parameter 502 and a corresponding baseline QoS parameter 504. Any suitable methodology may be used to calculate the incident score depending on the implementation. In general, the incident score may be proportional to the difference between the real-time QoS parameter and the baseline QoS parameter in cases where the real-time QoS parameter is lower than the baseline QoS parameter. Thus, as one example, the incident score may be calculated as the difference between the real-time and baseline QoS parameters. Alternatively, the incident score may be normalized to a selected range (e.g., between 0 and 1, 0 and 100, etc.).

In some cases, the incident score may be calculated using a function that receives additional inputs besides the real-time QoS parameter and the baseline QoS parameter. This is also schematically illustrated with respect to FIG. 5. For instance, in this example, the incident score is additionally calculated based on an area priority parameter 506, which is proportional to the relative priority of the affected geographic area. The area priority parameter may be determined based on the proportion of all global data traffic that is directed to that geographic area. For instance, a country that represents 2% of all global traffic may have a higher regional priority parameter than another country that represents 0.05% of all global traffic. Thus, for the same difference in real-time and baseline QoS parameters, a higher-traffic area may have a higher incident score than a lower-traffic area. In other examples, additional or alternative criteria (such as an area's geographic size and population density) may be considered in determining a priority parameter for that area.

Additionally, in this example, the incident score is calculated based at least in part on an incident duration parameter 508. This indicates the length of time for which the current incident has persisted—e.g., the length of time since the real-time QoS parameter initially dropped below the baseline QoS parameter for the current time interval. The incident score may be proportional to the incident duration parameter. In other words, over time, the incident score for an ongoing incident may increase even if the underlying QoS parameters do not change, due to the incident's increasing duration.

Additionally, FIG. 5 schematically depicts an incident threshold 510. This may indicate a threshold at which the incident score is sufficiently high to constitute an incident that should be tracked and responded to. For instance, this may specify a threshold at which the network monitoring computing system triggers one or more automated responses to attempt to improve network performance. In some examples, multiple different thresholds may be used. For instance, one threshold may correspond to generation of an incident ticket in a ticket management system, another threshold may cause an automatic alarm for human operators, another threshold may trigger automated redirection of network traffic, etc.

It will be understood that the incident score may be calculated based on any or all of the different parameters depicted in FIG. 5, which may be weighted or adjusted in any suitable way. Furthermore, in some cases, the incident score may be calculated based on additional or alternative types of information not explicitly discussed herein. In some examples, the incident score for a given area may be output by a function such as the following:

$$\text{Incident Score} = f(\text{duration, threshold, realtime } QoS, \text{ baseline } QoS, \text{ priority})$$

In some cases, an incident may be triggered due to conditions beyond the control of the data delivery platform, such as disruptions to the local network infrastructure of the geographic area. As such, in order to avoid repeated alarms or automated responses to an ongoing incident that the data delivery platform cannot resolve, then in some cases the current level of network performance may be acknowledged as the new baseline and the incident score may be reset to a minimum value (e.g., zero). In other words, in some scenarios, the incident score for an ongoing incident may be periodically recalculated. In response to determining that the incident score has not increased for at least a reset threshold period of time (e.g., a few hours, days, or weeks), then the incident score may be reset to its minimum value indicative of normal network performance.

As discussed above, based on the incident score, the network monitoring computing system may trigger automatic redirection of data traffic to the client computing devices in an attempt to reduce the incident score, and thereby improve network conditions. Automatic redirection of network traffic is schematically illustrated with respect to FIG. 6. This schematically shows another example data source 600 (e.g., personal computer, server computing system) communicatively coupled with a plurality of client computing devices 602A-602C, and transmitting data traffic to the client computing devices. In this example, a first portion 604A of the data traffic is delivered to the client computing devices via a first CDN 606A, while a second portion 604B of the data traffic is delivered via a second CDN 606B.

As discussed above, each CDN may include a geographically distributed plurality of server computing devices configured to receive a portion of the data traffic from the data source, and deliver the portion of the data traffic to the plurality of client computing devices within a given geographic area. For instance, CDN 606A includes a plurality of intermediary servers 608A and 608B, while CDN 606B includes intermediary servers 608C and 608D. In this example, at least two CDNs are used to deliver data traffic to the same geographic area, although this is non-limiting.

An observed degradation in network performance for the geographic area may in some cases be attributable to problems at one or more of the CDNs. To this end, the network monitoring computing system may initiate an automated root cause analysis (RCA) process to attempt to determine if one or both of the CDNs 606A and 606B are contributing to the performance degradation. This may include calculating different relative contribution scores for each CDN (e.g., first CDN 606A and second CDN 606B), and then automatically redirecting at least a portion of the data traffic based on determining that one or more of these relative contribution scores exceeds a threshold.

Figure 6:
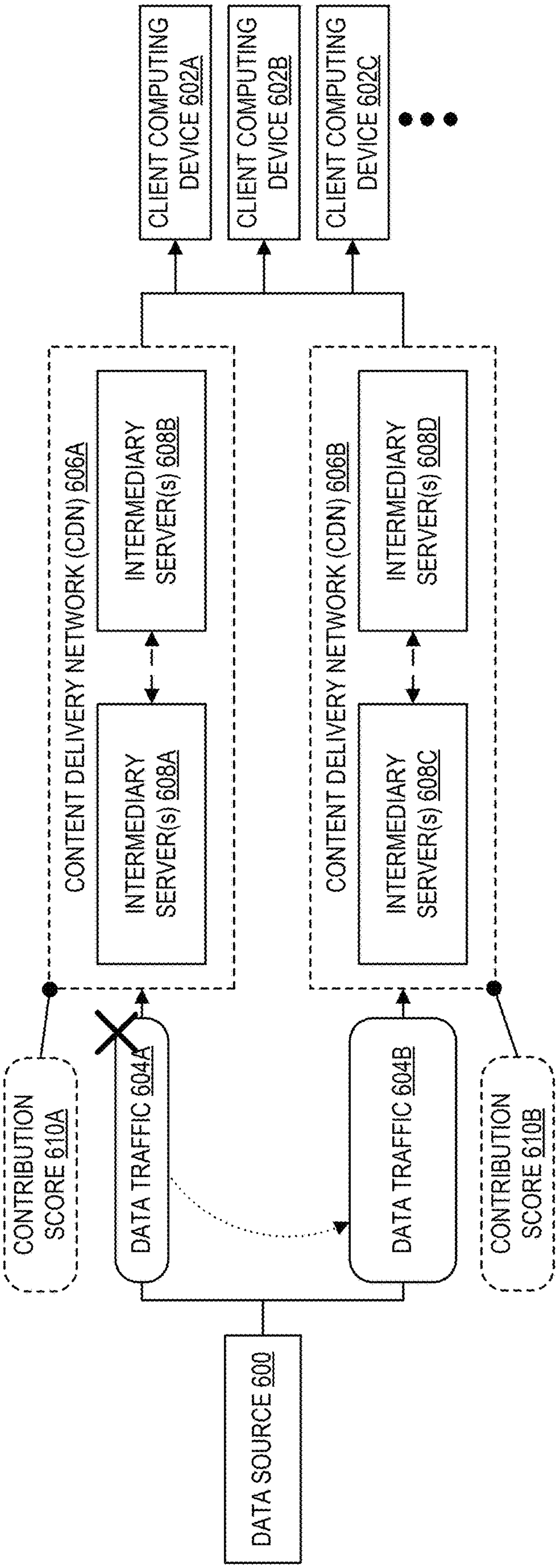
FIG. 6 schematically illustrates automatic redirection of data traffic from one content delivery network (CDN) to another.

This is also schematically illustrated with respect to FIG. 6, in which the network management computing system has calculated a first relative contribution score 610A for CDN 606A, and a second relative contribution score 610B for CDN 606B. Based on determining that contribution score 610A exceeds a predetermined threshold, the data delivery platform has redirected at least a portion of the data traffic away from CDN 606A and toward CDN 606B. This is indicated in FIG. 6 by the smaller size used to represent the first data traffic portion 604A, and the X symbol overlaid on first data traffic portion 604A, indicating that the data delivery platform is transmitting less data to CDN 606A. In other words, the first portion of the data traffic delivered to the client computing devices using the first CDN is reduced, and the second portion of the data traffic delivered using the second CDN is increased. In some examples, this may include discontinuing use of CDN 606A for at least a temporary period.

A contribution score for a given CDN may be calculated in any suitable way. This may include weighted and/or unweighted contribution scores. For instance, a weighted score may reflect the negative impact that a given CDN or CDN combination has on the network's performance in a given geographic area, relative to traffic volume. An unweighted score may measure the negative impact relative to the CDN's own historical performance, independent of traffic volume.

In some cases, separate incident scores may be calculated for each CDN. For instance, the network monitoring computing system may calculate different real-time QoS parameters for each CDN, based on the relative quality of the data traffic delivered to client computing devices via that CDN, as discussed above. These CDN-specific real-time parameters may be compared to the corresponding baseline QoS parameter for that geographic area to calculate a CDN-specific incident score. In one approach, each of these CDN-specific incident scores may be totaled, and then the system may determine the percentage contribution of each CDN. For instance, in one scenario, a first CDN has an incident score of 0.008, a second CDN has a score of 0.002, and a third CDN has an incident score of 0.01. These total to 0.02. As such, the first CDN has a 40% contribution score (0.008/0.02=40%), while the second CDN has a 10% contribution score, and the third CDN has a 50% contribution score. Any suitable threshold may be set for automatically redirecting data traffic away from a CDN. For instance, as one example, a threshold of 45% may be set, such that at least some data traffic is automatically redirected away from the third CDN and toward either or both of the first and second CDNs.

In some cases, after automatic redirection of network traffic, the network monitoring computing system may continue monitoring data transmission quality to the geographic area, in order to determine if the automated traffic redirection has reduced the incident score. If not, then the redirection may be rolled back, such that a normal volume of data traffic is once again transmitted to the identified CDN. If the automated traffic redirection does improve the incident score, then the system may in some cases continue directing additional traffic away from the identified CDN, until the incident score falls below a threshold or another suitable criterion is met (e.g., a communication from the CDN vendor indicating that normal operations have been restored).

In some cases, a human operator may ultimately initiate any rollback of automated traffic redirection. For instance, the network monitoring computing system may generate an ongoing incident ticket in a ticket tracking system, which periodically notifies human operators of the current network conditions and any automated attempts to resolve detected network problems. This ticket may in some cases persist until a human operator initiates rollback procedures or otherwise indicates that the incident has been resolved.

In some cases, data traffic transmitted to a given geographic area may be delivered via a combination of two or more CDNs, including push CDNs and pull CDNs. A "push" CDN may refer to a configuration where data traffic is proactively uploaded or "pushed" from the origin server to the CDN's edge servers before client requests occur. By contrast, a "pull" CDN may refer to configurations where content is fetched or "pulled" from the origin server on-demand when a client requests it. The CDN only caches the content after the initial request, and subsequent requests are served from the CDN cache.

Figure 7:
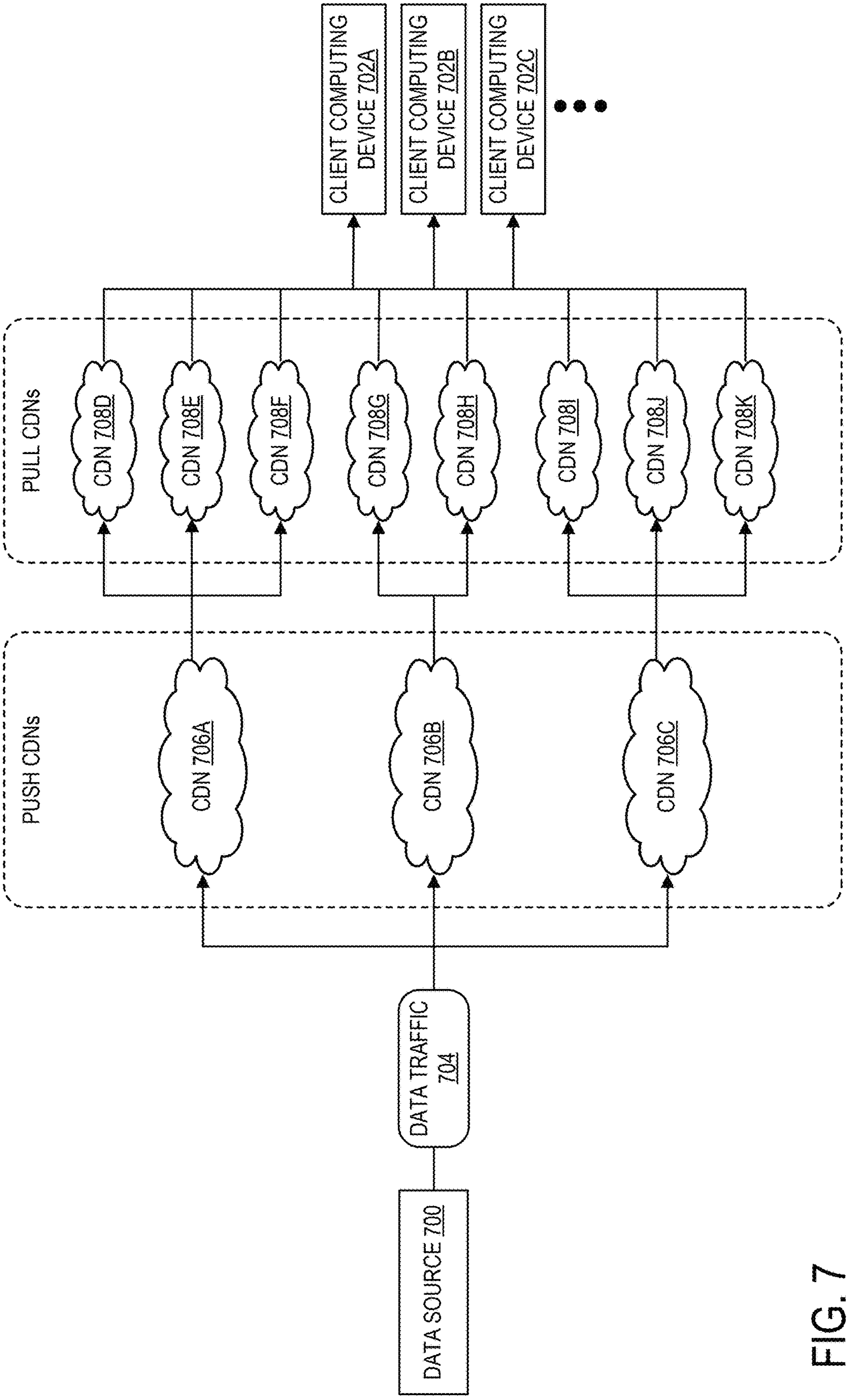
FIG. 7 schematically depicts a network environment in which data traffic is delivered to client computing devices via a plurality of different CDN combinations.

FIG. 7 schematically illustrates an example network environment where a data source 700 is communicatively coupled with a plurality of client computing devices 702A, 702B, and 702C, and delivers data traffic 704 to the client computing devices via a plurality of CDNs. Specifically, this arrangement includes at least three push CDNs 706A, 706B, and 706C. Each push CDN serves data traffic to two or more corresponding pull CDNs. For instance, push CDN 706A interfaces with pull CDNs 708D-F, push CDN 706B interfaces with pull CDNs 708G and 708H, and push CDN 706C interfaces with pull CDNs 708I-K.

In some examples, an observed degradation in network performance may be attributable to any of the various CDNs 708 depicted in FIG. 7, or a combination of more than one CDN. As such, in some cases, the network monitoring computing system may generate and order a list of the different push/pull CDN combinations. For instance, one combination includes push CDN 706A and pull CDN 708D, and another combination includes push CDN 706A and pull CDN 708E. The system may additionally generate weighted incident scores for each push/pull CDN combination, just as incident scores may be calculated for individual CDNs as discussed above. The list of CDN combinations may be ordered by their weighted incident scores in descending order. If the top combinations in the list each share the same push CDN, then this indicates that the push CDN is contributing to the observed network degradation. If not, then this indicates that one or more of the pull CDNs are contributing to the observed network degradation.

Figure 8:
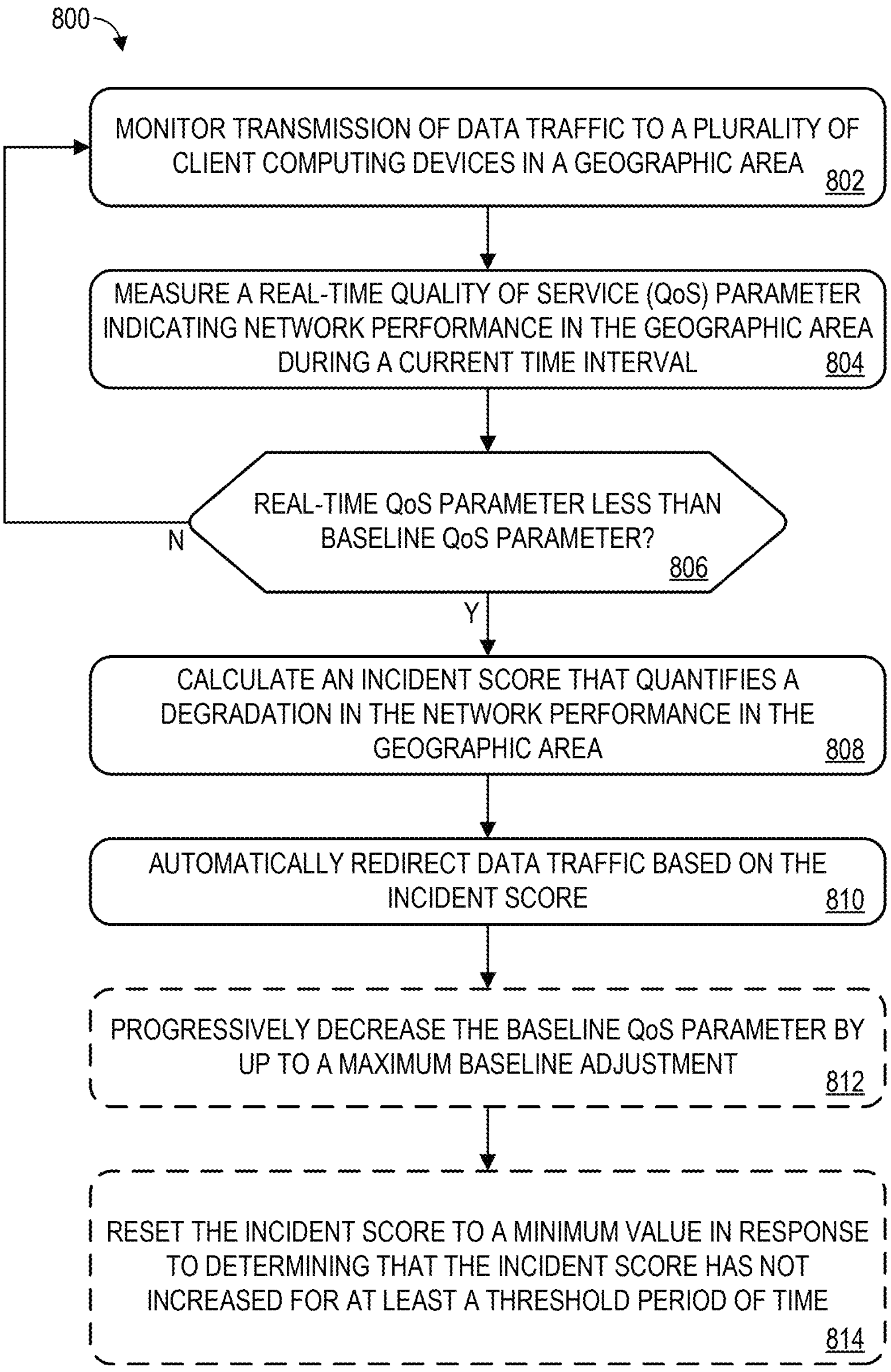
FIG. 8 illustrates an example method for redirecting data traffic in a computer network.

FIG. 8 illustrates an example method 800 for automatically redirecting data traffic in a computer network. Steps of method 800 may be initiated, terminated, and/or repeated at any suitable time and in response to any suitable condition. Method 800 may be implemented by any suitable computing system of one or more computing devices. Any computing device implementing steps of method 800 may have any suitable capabilities, hardware configuration, and form factor. As one non-limiting example, method 800 may be implemented by computing system 900 described below with respect to FIG. 9.

At 802, method 800 includes monitoring transmission of data traffic to a plurality of different client computing devices in a geographic area. As discussed above, in some cases, a data delivery platform may transmit data traffic to client computing devices distributed between a plurality of different geographic areas. This may include, for instance, different cities, districts, countries, continents, and/or any other suitable divisions of the physical world.

At 804, method 800 includes measuring a real-time QoS parameter indicating the network performance in a given geographic area during a current time interval. As discussed above, this may be determined based on any suitable information, and expressed relative to any suitable time interval. As one non-limiting example, each real-time QoS parameter may be expressed relative to one hour of time. Furthermore, a real-time QoS parameter may include, or be calculated based on, any or all of an average rate of packet loss for the client computing devices, round trip latency, bitrate stability, pull success rate (PSR), buffering time and/or frequency (e.g., the frequency and duration of a client-side media player buffering during data playback), client-side telemetry, viewer engagement metrics, and/or any other suitable information.

At 806, method 800 includes determining whether the real-time QoS parameter is less than a corresponding baseline QoS parameter for the same geographic area. As discussed above, in some examples, different baseline QoS parameters may be maintained for different times. For instance, each day, each hour, each minute, etc., may have different corresponding baseline QoS parameters, indicating the expected average network performance for that period of time.

If NO at 806 (e.g., the real-time QoS parameter is not lower than the baseline QoS parameter), then no incident is detected and method 800 returns to 802. If YES at 806, then method 800 proceeds to 808, which includes calculating an incident score that quantifies an observed degradation in the network performance in the geographic area. As discussed above, the incident score may be proportional to the difference between the real-time QoS parameter and the baseline QoS parameter—e.g., with respect to FIGS. 3 and 4, the incident score may be proportional to the area between the lines representing the real-time QoS parameter and the baseline QoS parameter over a given time interval. In some cases, the incident score may be calculated based on additional parameters besides the real-time and baseline QoS parameters as discussed above, such as an incident duration parameter and an area priority parameter.

At 810, method 800 includes automatically redirecting at least a portion of the data traffic based on the incident score. For instance, as discussed above, this may include redirecting at least a portion of the data traffic from one CDN to another, after determining that the identified CDN has a relative contribution score exceeding a threshold.

At 812, method 800 optionally includes progressively decreasing the baseline QoS parameter by up to a maximum baseline adjustment. For instance, as discussed above, this can beneficially account for scenarios where network performance is gradually degrading due to conditions beyond the control of the data delivery platform. By progressively reducing the baseline QoS parameter, the incident score is reduced, and therefore the data delivery platform may take fewer or no actions in response to the detected incident. As one non-limiting example, the baseline QoS parameter may be reduced by 0.2% every hour until a 1% reduction has been reached.

At 814, method 800 optionally includes resetting the incident score to a minimum value in response to determining that the incident score has not increased for at least a threshold period of time. This can beneficially account for scenarios where an observed network degradation is likely to persist for the foreseeable future—e.g., due to local network conditions or usage patterns at the affected geographic area. In this manner, by resetting the incident score, the data delivery platform may acknowledge that the current observed network conditions are likely to continue and thereby do not require further mitigation efforts by the automated systems and/or human operators of the data delivery platform.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
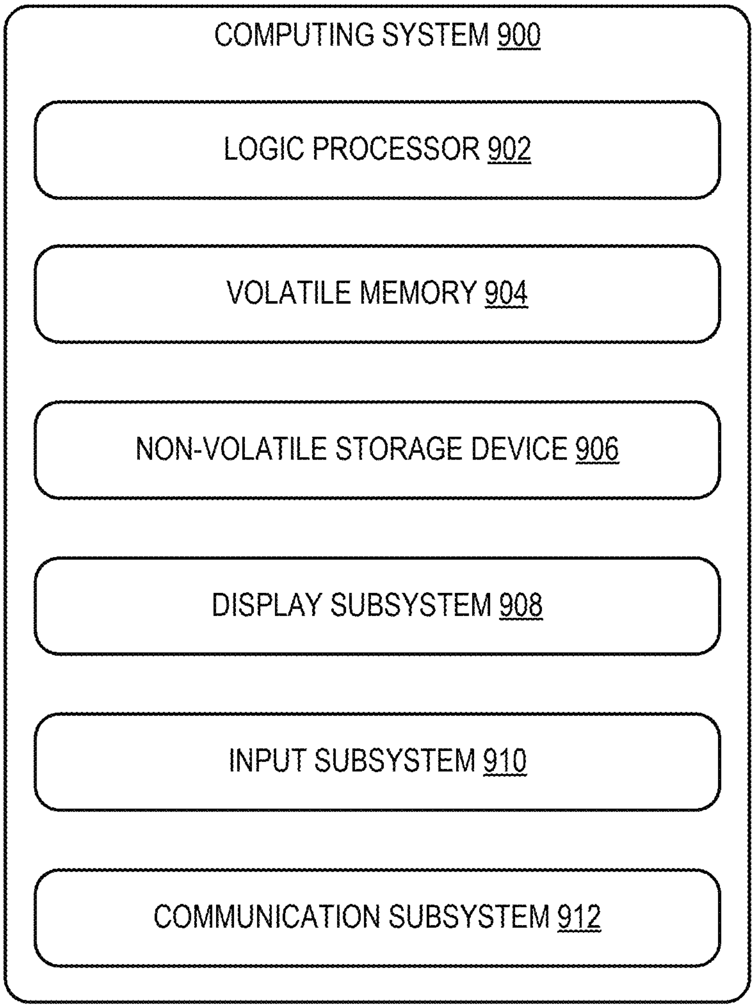
FIG. 9 schematically shows an example computing system.

FIG. 9 schematically shows a non-limiting embodiment of a computing system 900 that can enact one or more of the methods and processes described above. Computing system 900 is shown in simplified form. Computing system 900 may embody the computer device 10 described above and illustrated in FIG. 2. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional description of the subject matter of the present disclosure:

In an example, a method for redirecting data traffic in a computer network comprises: monitoring transmission of data traffic to a plurality of client computing devices in a geographic area via a computer network, wherein the computer network includes at least a first content delivery network (CDN) and a second CDN; measuring a real-time Quality of Service (QoS) parameter that indicates a network performance of the computer network in the geographic area during a current time interval; detecting that the real-time QoS parameter is lower than a baseline QoS parameter that indicates a historical performance of the computer network in the geographic area; based at least in part on the real-time QoS parameter and the baseline QoS parameter, calculating an incident score that quantifies a degradation in the network performance in the geographic area; and automatically redirecting the data traffic based at least in part on the incident score, such that a first portion of the data traffic delivered to the plurality of client computing devices using the first CDN is reduced, and a second portion of the data traffic delivered using the second CDN is increased. In this example or any other example, the incident score is further calculated based at least in part on an incident duration parameter, indicating a length of time since the real-time QoS parameter dropped below the baseline QoS parameter. In this example or any other example, the incident score is further calculated based at least in part on an area priority parameter, indicating a priority of the geographic area. In this example or any other example, the data traffic is automatically redirected based at least in part on the incident score exceeding a threshold. In this example or any other example, the method further comprises measuring a first baseline candidate for a first previous interval of time, and a second baseline candidate for a second previous interval of time, and selecting, as the baseline QoS parameter, whichever of the first baseline candidate and the second baseline candidate is higher. In this example or any other example, the method further comprises, in response to determining that the real-time QoS parameter is lower than the baseline QoS parameter, progressively decreasing the baseline QoS parameter by up to a maximum baseline adjustment. In this example or any other example, the method further comprises periodically recalculating the incident score, and in response to determining that the incident score has not increased for at least a reset threshold period of time, resetting the incident score to a minimum value. In this example or any other example, the method further comprises calculating relative contribution scores for the first CDN and the second CDN, and wherein the data traffic is redirected based at least in part on determining that a relative contribution score for the first CDN exceeds a threshold. In this example or any other example, the geographic area is one of a plurality of different geographic areas, and wherein the method further comprises measuring a plurality of other real-time QoS parameters for each of the plurality of different geographic areas. In this example or any other example, the first CDN comprises a geographically distributed plurality of server computing devices configured to receive the first portion of the data traffic from a data source, and deliver the first portion of the data traffic to the plurality of client computing devices within the geographic area.

In an example, a computing system comprises: a processor; and a storage device holding instructions executable by the processor to: monitor transmission of data traffic to a plurality of client computing devices in a geographic area via a computer network, wherein the computer network includes at least a first content delivery network (CDN) and a second CDN; measure a real-time Quality of Service (QoS) parameter that indicates a network performance of the computer network in the geographic area during a current time interval; detect that the real-time QoS parameter is lower than a baseline QoS parameter that indicates a historical performance of the computer network in the geographic area; based at least in part on the real-time QoS parameter and the baseline QoS parameter, calculate an incident score that quantifies a degradation in the network performance in the geographic area; and automatically redirect the data traffic based at least in part on the incident score, such that a first portion of the data traffic delivered to the plurality of client computing devices using the first CDN is reduced, and a second portion of the data traffic delivered using the second CDN is increased. In this example or any other example, the incident score is further calculated based at least in part on an incident duration parameter, indicating a length of time since the real-time QoS parameter dropped below the baseline QoS parameter. In this example or any other example, the incident score is further calculated based at least in part on an area priority parameter, indicating a priority of the geographic area. In this example or any other example, the data traffic is automatically redirected based at least in part on the incident score exceeding a threshold. In this example or any other example, the instructions are further executable to measure a first baseline candidate for a first previous interval of time, and a second baseline candidate for a second previous interval of time, and select, as the baseline QoS parameter, whichever of the first baseline candidate and the second baseline candidate is higher. In this example or any other example, the instructions are further executable to, in response to determining that the real-time QoS parameter is lower than the baseline QoS parameter, progressively decrease the baseline QoS parameter by up to a maximum baseline adjustment. In this example or any other example, the instructions are further executable to periodically recalculate the incident score, and in response to determining that the incident score has not increased for at least a reset threshold period of time, reset the incident score to a minimum value. In this example or any other example, the instructions are further executable to calculate relative contribution scores for the first CDN and the second CDN, and wherein the data traffic is redirected based at least in part on determining that a relative contribution score for the first CDN exceeds a threshold. In this example or any other example, the geographic area is one of a plurality of different geographic areas, and wherein the instructions are further executable to measure a plurality of other real-time QoS parameters for each of the plurality of different geographic areas.

In an example, a method for redirecting livestreamed video data traffic in a computer network comprises: monitoring transmission of livestreamed video data traffic to a plurality of client computing devices in a geographic area via a computer network, wherein the computer network includes at least a first content delivery network (CDN) and a second CDN; measuring a real-time Quality of Service (QoS) parameter that indicates a network performance of the computer network in the geographic area during a current time interval; detecting that the real-time QoS parameter is lower than a baseline QoS parameter that indicates a historical performance of the computer network in the geographic area; calculating an incident score that quantifies a degradation in the network performance in the geographic area, based at least in part on the real-time QoS parameter, the baseline QoS parameter, an incident duration parameter indicating a length of time since the real-time QoS parameter dropped below the baseline QoS parameter, and an area priority parameter indicating a priority of the geographic area; and automatically redirecting the livestreamed video data traffic based at least in part on the incident score, such that a first portion of the livestreamed video data traffic delivered to the plurality of client computing devices using the first CDN is reduced, and a second portion of the livestreamed video data traffic delivered using the second CDN is increased.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for redirecting data traffic in a computer network, the method comprising:

monitoring transmission of data traffic to a plurality of client computing devices in a geographic area via a computer network, wherein the computer network includes at least a first content delivery network (CDN) and a second CDN;

measuring a real-time Quality of Service (QoS) parameter that indicates a network performance of the computer network in the geographic area during a current time interval;

detecting that the real-time QoS parameter is lower than a baseline QoS parameter that indicates a historical performance of the computer network in the geographic area;

based at least in part on the real-time QoS parameter and the baseline QoS parameter, calculating an incident score that quantifies a degradation in the network performance in the geographic area; and automatically redirecting the data traffic based at least in part on the incident score, such that a first portion of the data traffic delivered to the plurality of client computing devices using the first CDN is reduced, and a second portion of the data traffic delivered using the second CDN is increased.

2. The method of claim 1, wherein the incident score is further calculated based at least in part on an incident duration parameter, indicating a length of time since the real-time QoS parameter dropped below the baseline QoS parameter.

3. The method of claim 1, wherein the incident score is further calculated based at least in part on an area priority parameter, indicating a priority of the geographic area.

4. The method of claim 1, wherein the data traffic is automatically redirected based at least in part on the incident score exceeding a threshold.

5. The method of claim 1, further comprising measuring a first baseline candidate for a first previous interval of time, and a second baseline candidate for a second previous interval of time, and selecting, as the baseline QoS parameter, whichever of the first baseline candidate and the second baseline candidate is higher.

6. The method of claim 1, further comprising, in response to determining that the real-time QoS parameter is lower than the baseline QoS parameter, progressively decreasing the baseline QoS parameter by up to a maximum baseline adjustment.

7. The method of claim 1, further comprising periodically recalculating the incident score, and in response to determining that the incident score has not increased for at least a reset threshold period of time, resetting the incident score to a minimum value.

8. The method of claim 1, further comprising calculating relative contribution scores for the first CDN and the second CDN, and wherein the data traffic is redirected based at least in part on determining that a relative contribution score for the first CDN exceeds a threshold.

9. The method of claim 1, wherein the geographic area is one of a plurality of different geographic areas, and wherein the method further comprises measuring a plurality of other real-time QoS parameters for each of the plurality of different geographic areas.

10. The method of claim 1, wherein the first CDN comprises a geographically distributed plurality of server computing devices configured to receive the first portion of the data traffic from a data source, and deliver the first portion of the data traffic to the plurality of client computing devices within the geographic area.

11. A computing system, comprising:

a processor; and a storage device holding instructions executable by the processor to:

monitor transmission of data traffic to a plurality of client computing devices in a geographic area via a computer network, wherein the computer network includes at least a first content delivery network (CDN) and a second CDN;

measure a real-time Quality of Service (QoS) parameter that indicates a network performance of the computer network in the geographic area during a current time interval;

detect that the real-time QoS parameter is lower than a baseline QoS parameter that indicates a historical performance of the computer network in the geographic area;

based at least in part on the real-time QoS parameter and the baseline QoS parameter, calculate an incident score that quantifies a degradation in the network performance in the geographic area; and automatically redirect the data traffic based at least in part on the incident score, such that a first portion of the data traffic delivered to the plurality of client computing devices using the first CDN is reduced, and a second portion of the data traffic delivered using the second CDN is increased.

12. The computing system of claim 11, wherein the incident score is further calculated based at least in part on an incident duration parameter, indicating a length of time since the real-time QoS parameter dropped below the baseline QoS parameter.

13. The computing system of claim 11, wherein the incident score is further calculated based at least in part on an area priority parameter, indicating a priority of the geographic area.

14. The computing system of claim 11, wherein the data traffic is automatically redirected based at least in part on the incident score exceeding a threshold.

15. The computing system of claim 11, wherein the instructions are further executable to measure a first baseline candidate for a first previous interval of time, and a second baseline candidate for a second previous interval of time, and select, as the baseline QoS parameter, whichever of the first baseline candidate and the second baseline candidate is higher.

16. The computing system of claim 11, wherein the instructions are further executable to, in response to determining that the real-time QoS parameter is lower than the baseline QoS parameter, progressively decrease the baseline QoS parameter by up to a maximum baseline adjustment.

17. The computing system of claim 11, wherein the instructions are further executable to periodically recalculate the incident score, and in response to determining that the incident score has not increased for at least a reset threshold period of time, reset the incident score to a minimum value.

18. The computing system of claim 11, wherein the instructions are further executable to calculate relative contribution scores for the first CDN and the second CDN, and wherein the data traffic is redirected based at least in part on determining that a relative contribution score for the first CDN exceeds a threshold.

19. The computing system of claim 11, wherein the geographic area is one of a plurality of different geographic areas, and wherein the instructions are further executable to measure a plurality of other real-time QoS parameters for each of the plurality of different geographic areas.

20. A method for redirecting livestreamed video data traffic in a computer network, the method comprising:

monitoring transmission of livestreamed video data traffic to a plurality of client computing devices in a geographic area via a computer network, wherein the computer network includes at least a first content delivery network (CDN) and a second CDN;

measuring a real-time Quality of Service (QoS) parameter that indicates a network performance of the computer network in the geographic area during a current time interval;

detecting that the real-time QoS parameter is lower than a baseline QoS parameter that indicates a historical performance of the computer network in the geographic area;

calculating an incident score that quantifies a degradation in the network performance in the geographic area, based at least in part on the real-time QoS parameter, the baseline QoS parameter, an incident duration parameter indicating a length of time since the real-time QoS parameter dropped below the baseline QoS parameter, and an area priority parameter indicating a priority of the geographic area; and automatically redirecting the livestreamed video data traffic based at least in part on the incident score, such that a first portion of the livestreamed video data traffic delivered to the plurality of client computing devices using the first CDN is reduced, and a second portion of the livestreamed video data traffic delivered using the second CDN is increased.

* * * * *